(12) United States Patent
Smith et al.

(10) Patent No.: US 6,785,592 B1
(45) Date of Patent: Aug. 31, 2004

(54) SYSTEM AND METHOD FOR ENERGY MANAGEMENT

(75) Inventors: Edward M. Smith, Plano, TX (US); David R. Sewell, Churt (GB); Patrick T. Golden, Flower Mound, TX (US)

(73) Assignee: Perot Systems Corporation, Plano, TX (US)

(*) Notice: Subject to any disclaimer, the term of this patent is extended or adjusted under 35 U.S.C. 154(b) by 141 days.

(21) Appl. No.: 09/615,413

(22) Filed: Jul. 13, 2000

Related U.S. Application Data

(60) Provisional application No. 60/144,316, filed on Jul. 16, 1999.

(51) Int. Cl.[7] .............................. G05D 3/12; G05D 5/00; G05D 9/00; G05D 11/00; G05D 17/00; G05D 23/00; G01R 11/56; G01R 21/133; G06F 17/00
(52) U.S. Cl. ........................................ 700/291; 705/412
(58) Field of Search ................................ 700/286, 291; 705/412

(56) References Cited

U.S. PATENT DOCUMENTS

| | | | | |
|---|---|---|---|---|
| 5,430,430 A | | 7/1995 | Gilbert ................... 340/310.01 |
| 5,566,084 A | * | 10/1996 | Cmar ......................... 700/276 |
| 5,794,212 A | * | 8/1998 | Mistr, Jr. ..................... 705/26 |
| 5,873,251 A | | 2/1999 | Iino ............................. 60/660 |
| 5,880,536 A | * | 3/1999 | Mardirossian ............... 307/44 |
| 6,088,688 A | * | 7/2000 | Crooks et al. ............... 705/412 |
| 6,122,603 A | * | 9/2000 | Budike, Jr. .................. 702/182 |
| 6,178,362 B1 | * | 1/2001 | Woolard et al. ............. 700/295 |
| 6,185,483 B1 | * | 2/2001 | Drees ........................... 700/295 |
| 2001/0025209 A1 | * | 9/2001 | Fukui et al. ................ 700/291 |

FOREIGN PATENT DOCUMENTS

EP  0 886 362  12/1998

OTHER PUBLICATIONS

N. Messina, A. Pappalardo, G. Anastasi, B. Morgana: "Automation, Storage and Photovoltaic Generation to Smooth the Load Diagram" IEEE, 1996, pp. 904–907, XP002152034.

* cited by examiner

Primary Examiner—Leo Picard
Assistant Examiner—Ryan Jarrett
(74) Attorney, Agent, or Firm—Jenkens & Gilchrist, P.C.

(57) ABSTRACT

A business methodology for optimizing energy procurement energy demand (usage) and energy supply for a facility or complex. After ascertaining a baseline model, energy consumption is monitored and adjusted to reflect dynamic economic factors of operations. With the accumulation of data, contract negotiations with energy suppliers may provide further energy savings. Over time and patterns of usage determined further savings and optimization in energy, equipment, staffing and other operational areas are obtained. Remote access provides efficient monitoring of established systems.

20 Claims, 7 Drawing Sheets

| Measurement and Verification Option | How Savings Are Calculated | Cost |
|---|---|---|
| Option A: Focuses on physical assessment of equipment changes to ensure the installation is to specification. Key performance factors (such as lighting wattage or chiller efficiency) are determined with spot or short-term measurements and operational factors (for example, lighting operating hours or cooling ton-hours) are stipulated based on analysis of historical data or spot/short-term measurements. Performance factors and proper operation are measured or checked annually. | Engineering calculations using spot or short-term measurements, computer simulations, and/or historical data. | Dependent on a number of measurement points. Approximately 1-5% of project construction cost. |
| Option B: Savings are determined after project completion by short-term or continuous measurements taken throughout the term of the contract at the device or system level. Both performance and operations factors are monitored. | Engineering calculations using metered data. | Dependent on number and type of systems measured and the term of analysis/metering. Typically 3-10% of project construction cost. |
| Option C: After project completion, savings are determined at the whole-building or facility level using current year and historical utility meter (gas or electricity) or sub-meter data. | Analysis of utility meter (or sub-meter) data using techniques from simple comparison to multivariate (hourly or monthly) regression analysis. | Dependent on the number and complexity of parameters in analysis. Typically 1-10% of project construction cost. |
| Option D: Savings are determined through simulation of facility components and/or the whole facility. | Calibrated energy simulation/modeling; calibrated with hourly or monthly utility billing data and/or end-use metering. | Dependent on number and complexity of system evaluated. Typically 3-10% of project construction cost. |

FIG. 7

SYSTEM AND METHOD FOR ENERGY MANAGEMENT

This Application claims priority from Provisional Application No. 60/144,316, filed on Jul. 16, 1999.

BACKGROUND OF THE PRESENT INVENTION

1. Field of the Invention

The present invention is directed to the optimization of energy procurement, energy demand (consumption) and energy supply, particularly in view of anticipated upcoming regulation changes to the energy business.

2. Background of the Invention

With the advance of the Industrial Age, the procurement of energy has become an increasingly daunting problem as Society migrates from one form of energy-producing resource to others, e.g., coal to oil to electricity. Although the specific technological mechanisms employed to harvest these discrete resources and convert them into usable energy is not the subject of this application for patent, it is nonetheless well understood to one skilled in the art as well as the layman that economic considerations drive the energy business. Over the course of the 20th century and as Society enters the $21^{st}$ century, electricity has become available to virtually all Americans and most of the developed countries of the world. Other resources, such as coal and oil, are increasingly used to produce electricity. Various facilities, such as hydroelectric dams and nuclear reactors, have been built to create additional sources for electrical energy.

Over time, governments have stepped in to regulate the energy industry, creating a complicated mosaic of rules and regulations regarding the gathering and consumption of the various distinct resources. Although necessary for standardization and environmental concerns, this government intervention spawned a bureaucratic infrastructure of immense complexity subject to political intrigue. Separate rules and regulations were developed to govern the customer side, i.e., from the power company to the consumer, and the production/transport side, i.e., from the natural resource to the power company.

The existing bureaucracies of rules and regulations for the discrete sides and respective energies are now under attack as new technologies permit heretofore unheard of interchanges between available energy sources, changing the economics dramatically. In particular, technologies allowing the real-time assessment of energy needs and selection between various energy sources based upon cost have begun to break down the bureaucratic walls designed to control the industries. With the creation of the Internet and increasing shift to e-commerce using the World Wide Web interconnections, there is at present a movement toward deregulation, allowing mergers of the separate industries or at least permitting the energy producers and sellers to operate more freely.

Winds of change are now sweeping through the energy industry, particularly in the electricity and gas markets. End consumers of energy are gaining the right to choose who will supply their energy commodity needs, something unthinkable just a few years ago. Deregulation, reregulation, liberalization, competition and the introduction of retail markets are but cause and effect events arising from this decisive change in attitudes and shift in rules.

With the advance of the Information Age, the Internet and e-commerce, the nature and value of information has changed, opening up numerous opportunities in information management. In the energy management area, the interconnections provided by a communications system offer possibilities for increasing energy efficiency through continuous or real-time monitoring.

There is, therefore, a clear need for improvements in the management of energy resources within a facility or in a complex of facilities, thereby lowering the costs for energy consumption.

It is, accordingly, an object of the present invention to provide an improved methodology for the gathering of information pertaining to the energy usage of a facility or facility complex, such as in establishing a baseline level of energy consumption.

It is also an object of the present invention to monitor the energy consumption performance of a facility relative to the ascertained baseline level and adapt to changes in energy availability to achieve an economic savings in energy consumption.

It is another object of the present invention that the methodology procure further economic savings by projecting energy availability and modify consumption accordingly.

It is also an object of the present invention to identify abnormalities within the pattern of energy consumption., further benchmarking the baseline level.

It is an additional object of the present invention that the methodology simulate energy consumption using the baseline level and operational data to determine proposed optimal operation conditions subject to user-specified comfort criteria.

It is further object of the present invention that a database of energy data be used to facilitate the measurement of energy consumption and actual savings, provide a mechanism for the verification of same, and/or provide a reporting procedure.

It is a still further object of the present invention that the aforementioned methodology, after initially optimizing the physical facility, include negotiation of energy procurement agreements with service providers, thereby securing additional energy economic savings.

It is yet another object of the present invention that the methodology, through dynamic real-time optimization and promote predictive maintenance, optimize equipment usage, reduce equipment and reduce staff.

SUMMARY OF THE INVENTION

The present invention is directed to a business methodology applicable to a variety of industrial, commercial and residential applications. The approach is focused toward the needs of the ultimate consumer such as through a direct relationship or indirect relationship via a retail energy provider or energy services company: (1) reduced overall costs, (2) providing enhanced services throughout the totality of the value chain, and (3) providing customization for different usages and industries (hotel vs. hospital) Overall, the methodology proposed herein provides a radically different perspective from the conventional approaches utilized within the United States, as well as other countries in the world.

In conjunction with the broad business model proposed herein, there are representative applications, e.g., in a school, where the techniques of the present invention may be applied. Through monitoring of existing usage, thereby forming a baseline for energy consumption, the energy usage may be dynamically adjusted pursuant to a variety of market conditions, e.g., switching from electricity to a gas as a function of energy costs. In addition, multiple energy resources may be used at a given ratio of usage that is a function of the energy costs of the energy resources.

The business model also includes the negotiation of economically advantageous energy procurement agreements with service providers, and otherwise further optimizing the energy consumption of a facility by virtue of remote monitoring and maintenance.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 7 generally illustrates various options and advantages for the verification procedure shown in FIG. 6.

DETAILED DESCRIPTION OF THE PRESENTLY PREFERRED EXEMPLARY EMBODIMENTS

Figure 1:
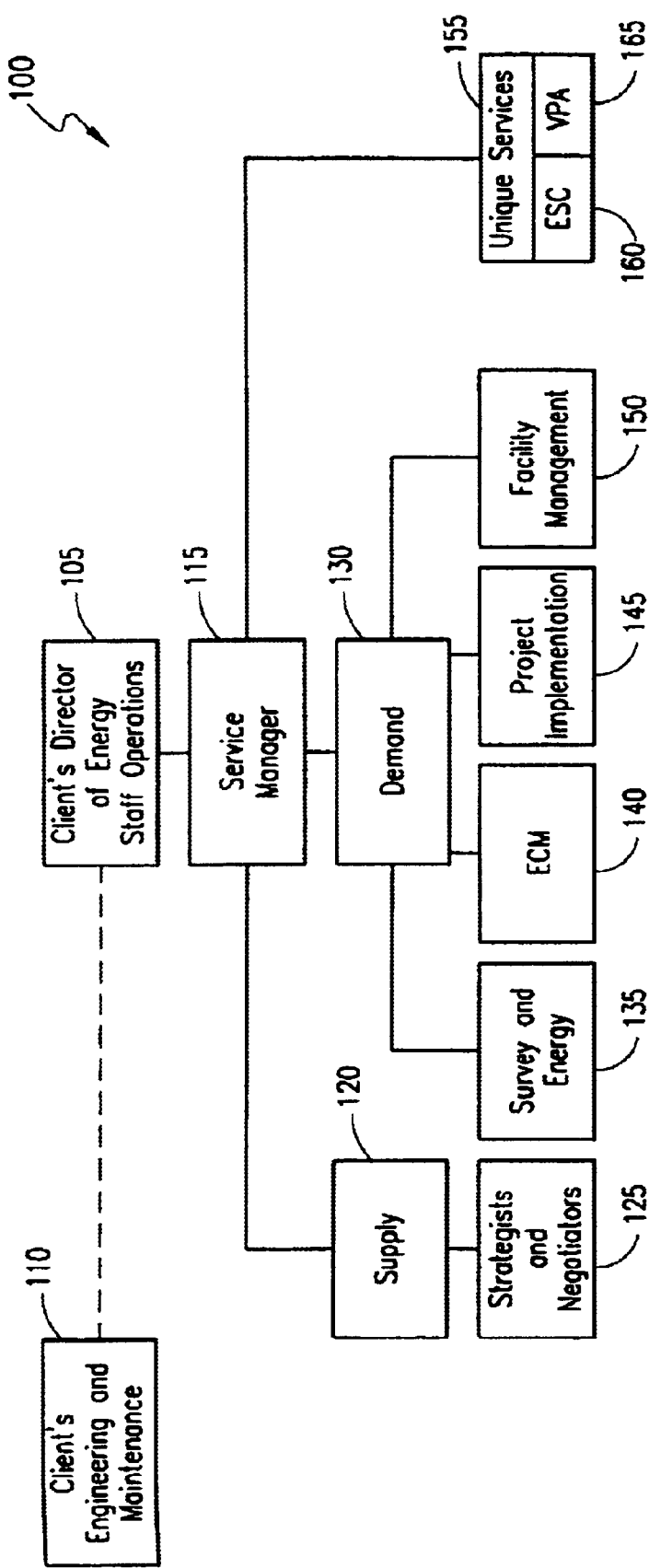
FIG. 1 illustrates the diversity of services provided by the methodology of the present invention.

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Prior to describing the present invention, it would be useful to address various concerns within the energy market, e.g., the overall size of the market, the types and amounts of energy consumed, and the influence that regulation and deregulation have on the new business.

The global electricity and energy market represents one of the world's largest industries. The traditional supply and transportation of energy in the United States market alone is currently about $300 billion dollars, and is, of course, expected to grow. At present, about 50% of this expenditure is the commodity energy component, e.g., electricity, natural gas and propane, 15% is the transmission cost and the remaining 35% represents distribution. Excluded from the above are expenditures on energy management automation systems; lighting and other energy-related facility retrofits; air conditioning units and generators; maintenance services; central plant operations; and administration of functions related to procurement, monitoring and usage of energy; and value-added services yet to be realized. One recent estimate of the size of new (demand and supply side) industry emerging from deregulation could exceed $800 billion dollars in annual revenues, with the commodity or supply side representing about one third of this annual expenditure and value-added services and financing representing the other two thirds.

Electricity and natural gas represent the largest of these consumables in terms of volumes and costs, together accounting for roughly 87% of energy usage. As expected, natural gas is heavily used in space heating and cooking, and electricity in lighting and other equipment use. One fundamental difference between gas (representing about one-third to one-half of an end client's energy commodity costs) and electricity (representing about one-half to two-thirds) is that whereas gas can be stored, electricity cannot.

Consequently, electricity prices are significantly more volatile, e.g., spot pricing during high demand can increase by 400 times, causing financial distress and bankruptcy to power marketers and retailers complying with fixed price supply contracts. Deregulation means increased price volatility, which may cause savvy consumers to modify their demand to best seize electricity price opportunities. Furthermore, since energy expenditures constitute a significant percentage of various industry sectors' total operating costs, effectuating improvements within the operating cost structures of major corporations is a chief goal of the instant invention.

As discussed, the energy market has been historically subject to extensive regulation, with supply, transportation and marketing of energy being conducted by geographic monopolies, such as regulated utilities. In the United States, regulated utilities have had their prices (rates) to consumers set on the basis of agreed return on capital. As is well understood by an ordinary consumer in a regulated market, consumers have no choice as to who supplies their energy or the nature of how that service is delivered to them, e.g., a utility company purchases and distributes energy, maintains their meters and administers billing to clients. Also, since utilities recover their distribution and transmission costs through rates established upon agreed return on capital, i.e., operating costs associated with the supply of services are added at cost to the rate (without margin), utilities have historically had little commercial incentive to reduce operating or energy commodity costs. Finally, although regulated utilities provide reliable, ubiquitous service as per their charter, individualized is product offerings have been considered as a matter of tariffs. Consequently, consumers perceive regulated utilities as caring little for "personalization" of client service.

Deregulation of gas and electricity markets is underway in various world geographic markets. For example, electricity deregulation in the United Kingdom has reached an advanced stage, with full choice of supplier offered down to the consumer level. The European Union recently introduced deregulation (liberalization) to offer clients the ability to choose their electricity energy supplier. In the United States, certain states (most notably California, Arizona, Pennsylvania and New York, along with several northeastern states) have instigated clear plans to deregulate electricity, and all states are expected to implement legislation to deregulate electricity supply in the near future. Without federal legislation, however, the nature, degree and time frames for this deregulation are uncertain. It should be understood that municipalities, such as Los Angeles, and cooperatives may contrive to operate outside these competitive open market parameters in the absence of federal legislation, despite deregulation in their respective states.

Gas deregulation in the United States, although already in effect at the wholesale level, has not progressed rapidly at the retail level, with the notable exception of the state of Georgia. The intent in Georgia is that the utility divest itself of all consumers, with ownership of the client market being allocated instead to various gas retailers on a pro rata basis (once 30 percent of consumers have elected to move from their regulated utility).

As is readily apparent to those in the art, one of the driving forces behind the deregulation movement across the United States is the difference in the price of electricity between the states. For example, the respective prices between the contiguous states of New York, New Jersey and Pennsylvania are 12.13 cents per kilowatt hour (¢/kWh), 10.35 ¢/kWh and 8.41 ¢/kWh. Other disparities between neighboring states further highlight the issue and increase the desire for deregulation.

Deregulation is and will continue to create a new, complex array of service providers across the entire energy value chain, including power marketers (who effectively operate at the wholesale level), retailers (also called aggregators) and energy service companies (ESCOs). It should be apparent that many of these new service providers will be subsidiaries of regulated utilities and others will be emergent companies. In either event, the track record for other deregulated markets suggests that these new and existing players will undergo significant consolidation over the next five years or so, consolidation which is already occurring in the United States.

Although commodity energy prices are expected to decline overall (along with associated margins of suppliers), any large cost savings gains arising from competition and the brand choice of suppliers (over 400 being registered at present in the United States) offered to consumers may be transitory. Instead, consolidations among providers is expected, with a significant emphasis on value creation, both to differentiate between market providers and to shift emphasis from a commodity cost per unit.

In any event, the primary importance of deregulation, particularly from the viewpoint of Applicants' invention, is that large consumers of energy have a heightened awareness of managing the usage and cost of energy. Furthermore, to remain competitive in their own marketplaces, they will be forced to invest in the expertise necessary to understand the complexities arising from the plethora of new choices being offered, including the full cost of consuming energy, as well as monitoring and optimizing usage, and negotiating optimal agreements for the supply of all related services. The instant invention, as set forth herein and claimed, is designed to seize the opportunities arising from these developments.

The instant invention provides a full service outsourcing technique covering all aspects of services and requirements associated with an end client's energy value chain needs, as better illustrated with reference to FIG. 1. The technique of the instant invention preferably assumes operational management responsibility under long-term (5–10 years) contracts with evergreen provisions.

Preferably, the instant techniques are applied to large corporate clients with a range of services extending across the entire energy value chain and are not dependent upon deregulation.

With reference again to FIG. 1, there is an overview of the particular services offered by the methodology of the instant invention, a hierarchy of which is generally designed by the reference numeral 100. At the client-side, a director of energy staff operations 105 oversees their own engineering and maintenance 110 as well as a service manager 115 of a service provider implementing the improvements of the subject invention. Service manager 115 oversees a supply 120, along with supply-side strategists and negotiators 125, who provide supply-side corporate strategy, perform portfolio analysis, prepare and evaluate proposals, negotiate contracts, coordinate pilot program registration and qualification, analyze rates and tariffs, negotiate tariffs, review and audit bills, manage and analyze contracts in realtime, and procure leveraged power marketer contracts, as is understood by those skilled in this art.

Service manager 115 also oversees a demand 130, associated with surveying and energy commissioning 135, energy conservation measures (ECM) coordination 140, project implementation 145 and facility management (on call) 150. The surveying and energy commissioning 135 duties include generation of a master knowledge base of properties, equipment and issues, as well as updating the knowledge base of any facility alterations, capital improvements and the like. Energy conservation measures coordination 140 includes analysis of third-party energy service offerings, generation of a master database of reference vendors/initiatives, real-time linkage of meter and energy management system information, priority targeting of capital ECM improvement investments, and the design and analysis of energy awareness programs. Project implementation 145 duties include on-call project-by-project program management and installation, as well as real-time measurement and verification analysis, and recording of results. Lastly, facility management 150 duties include consultation, maintenance and engineering efficiency programs, e.g., complexing or outsourcing, and facilitating the integration of ECMs to maintenance and engineering operations.

Service manager 115 also oversees a number of unique services, generally designed by the reference numeral 155, which can be subdivided into an energy services center (ESC) 160 and virtual property analysts (VPA) 165. Energy services center 160 offers a single point of contact for energy management services, data acquisition and monitoring continuously (24/7), predictive modeling and optimization analysis, help desk (24/7), real-time data exchange with power marketers, and web-based reporting services. Lastly, virtual property analysts 165 provide continuous identification of anomalies and opportunities for energy cost savings, ongoing recommendations on initiatives and actions for improvements, and real-time optimization and control of building energy consumption.

The techniques of the instant invention also provide the client's engineering and maintenance 110 crew with knowledge and insights for actions to optimize energy usage, and facilitate the prioritization and measurement of maintenance and engineering activities' impact on energy usage.

Figure 2:
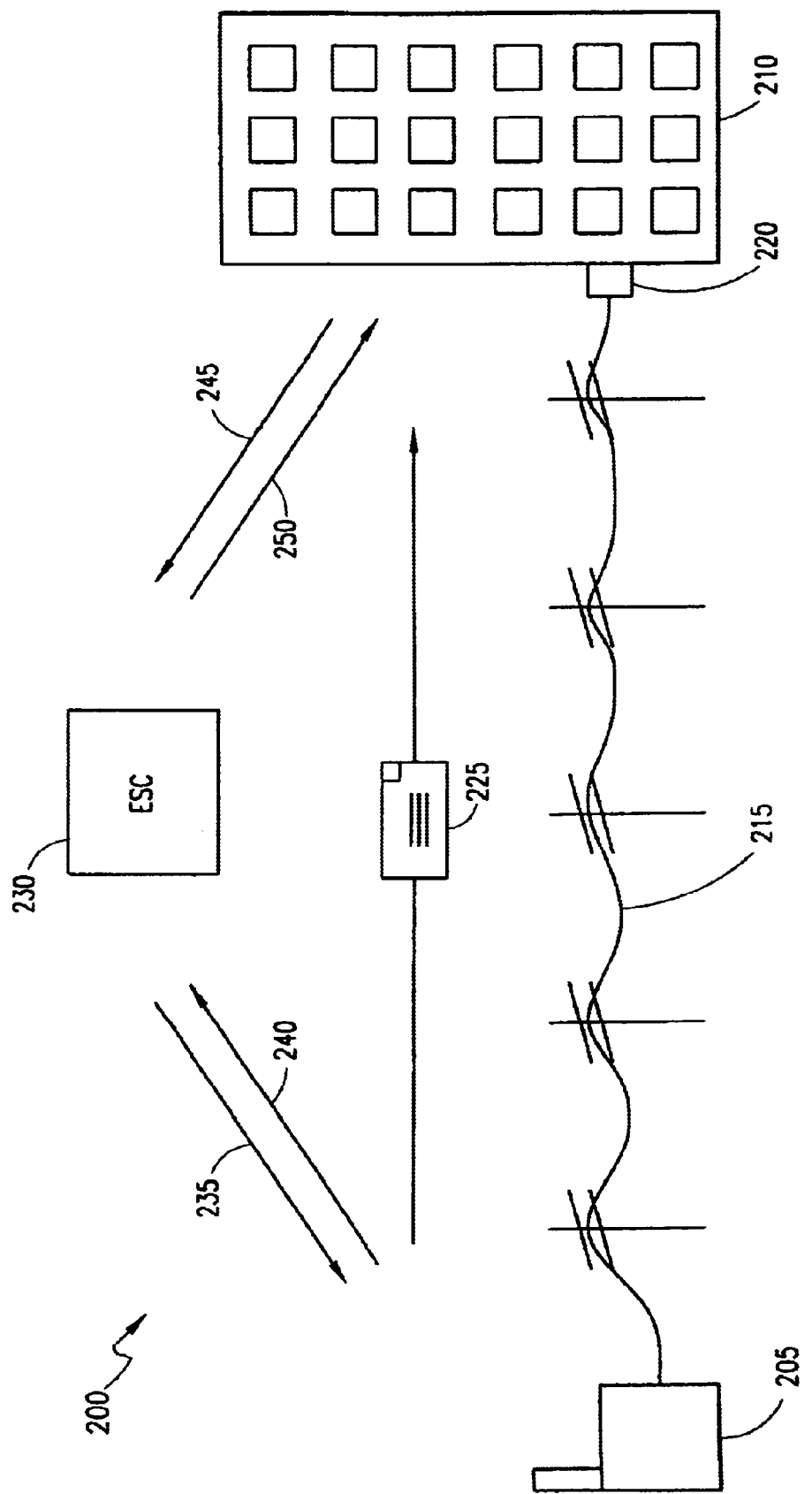
FIG. 2 illustrates a mechanism for implementing a range of progressive energy consumption cost savings measures in accordance with the improvements of the present invention.

By way of example, the methodology of the present invention may be employed to optimize energy consumption in a high-rise corporate facility, as illustrated in FIG. 2 and generally designated therein by the reference numeral 200. Independent or utility-owned power generation plants, generally designated by the reference numeral 205, supply electricity to the aforementioned high-rise, designated by the reference numeral 210, across a power supply mechanism, e.g., a number of power transmission wires 215. An electric meter 220 measures the amount of electricity consumption by the high-rise 210, and the respective plant(s) 205 generate and forward bills for services, generally represented by the reference numeral 225.

With further reference to FIG. 2, an energy services center 230 in accordance with the present invention acts as a middleman to facilitate energy optimization. First, the energy services center 230, at the supply side, i.e., with the plant(s) 205, negotiates highly leveraged energy supply agreements in exchange for the release of real-time information to power marketers, e.g., the plant(s) 205, using specific energy consumption models. This negotiation process is represented in FIG. 2 by arrow 235 directed to the plant(s) 205. Upon billing of the plant(s) 205, the energy services center 230 audits the energy billing information and models new customer supply contracts, ensuring optimum cost savings, as represented in the figure by arrow 240 directed to the ESC 230.

At the consumer side, the energy services center 230 receives gross consumption and equipment-specific energy consumption data from the building 210 and performs detailed analyses and predictive modeling, which is used to rationalize energy-related opportunities for the building 210, as represented in the figure by arrow 245. The energy services center 230, armed with the real-time operational data, optimizes systems performance through real-time control of the various, discrete building systems and subsystems, resulting in overall energy cost reductions, as represented in the figure by arrow 250 and discussed in more detail hereinafter.

Figure 3:
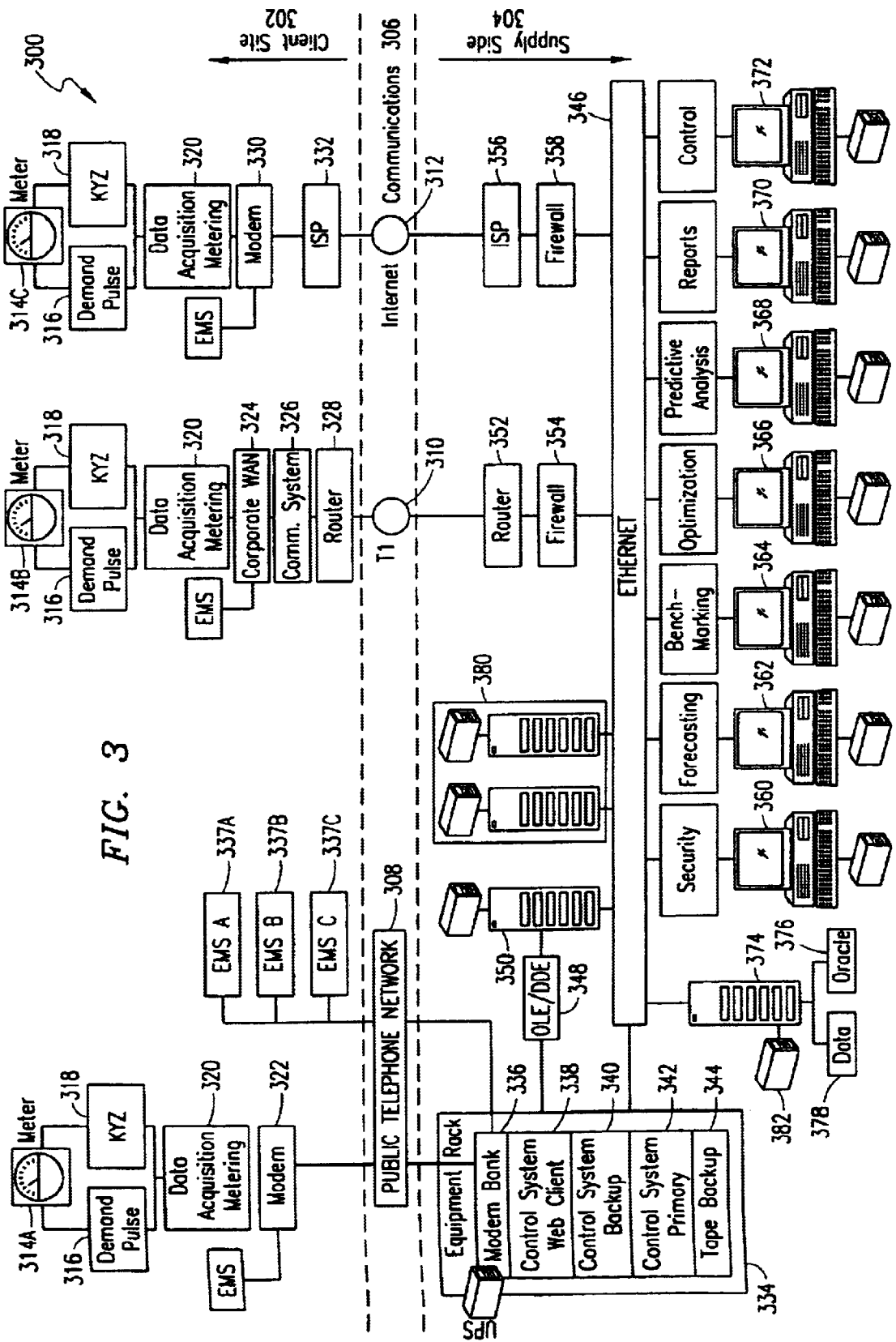
FIG. 3 illustrates an embodiment of the Energy Services Center in accordance with the principles of the present invention.

With reference now to FIG. 3, there is illustrated an exemplary configuration of energy services center 230, generally designated by the reference numeral 300, in accordance with the principles of the present invention. As noted in FIG. 3, the services and equipment are divided into a client side, generally designated by the reference numeral 302, and a services provider side, generally designated by the reference numeral 304. The two sides are connected across a communications portal 306, e.g., a public telephone network 308, a T1 line 310, or the Internet 312. It should, of course, be understood that other transmission mechanisms, wireline or wireless, may be used to communicate between the two sides.

On the client side 302, a number of meters 314 are used to measure energy consumption, each having respective demand pulses 316 and KYZ 318 devices associated therewith, as is understood in the power metering art. As shown in FIG. 3, data pertaining to the particular meter 314 in question, for example, meter 314A, is gathered by a respective data acquisition meter 320. The gathered data, containing information on energy consumption and other aspects of energy usage, is then sent through a modem 322 through the aforementioned public telephone network 308 to the services provider side 304. Other gathered data, for example, by the data acquisition meter 320 associated with meter 314B, is forwarded across a corporate wide area network (WAN) 324, through a communications system 326 therein, through a router 328 attached thereto, and through the aforementioned T1 line 310 to the services provider side 304. Still other gathered data, e.g., by the data acquisition meter 320 associated with meter 314C, is forwarded via a modem 330 through an Internet Services Provider (ISP) 332 across the Internet 312 to the services provider side 304.

On the services provider side 304, the data from the respective data acquisition meters 320 (or to the client side 302) passes across the respective communications portals 306. Data from the modem 322 (meter 314A), for example, is collected by an equipment rack 334 having a number of discrete components therein: a modem bank 336 for transceiving data therethrough, e.g., from a number of energy management systems (EMSs) 337A, 337B and 337C, a control system web client 338, a control system backup 340, a control system primary 342 and a tape backup 344. It should be understood that equipment rack 334 may be implemented using Redundant Arrays of Independent Drives (RAIDs) with associated disks. With reference again to FIG. 3, data from modem 322 passes from the equipment rack 336 to an Ethernet portal 346 and an OLE/DDE 348 to a server 350 also connected to the Ethernet 346. Data from the router 328 (from meter 314B), on the other hand, passes through the T1 line 310 to another router 352, and through a firewall 354 to reach the Ethernet portal 346. Finally, data from the ISP 332 (from meter 314C) passes across the Internet 312 to another ISP 356 on the services provider side 304 and through another firewall 358 to the Ethernet portal 346.

In this presently preferred embodiment, the Ethernet backbone 346 provides the requisite high-speed, high-bandwidth linkage to implement the interchange of information pursuant to the teachings of the present invention. In particular, a number of web client workstations dedicated to particular functions may be connected thereto. For simplicity of discussion, each workstation preferably handles a particular function, e.g., a security workstation 360, a forecasting workstation 362, a benchmarking workstation 364, an optimization workstation 366, a predictive analysis workstation 368, a reports workstation 370, and a control workstation 372. Respective Uninterrupted Power Supply (UPS) units 373 are attached to the workstations. It should, of course, be understood that a given workstation may perform multiple functions or several workstations may share one or more functions.

With further reference to FIG. 3, a server 374, e.g., Windows NT, may provide access to a database system 376, e.g., a Relational Data Base Management System, e.g., one by Oracle, and associated data 378. Also, one or more servers 380 may be dedicated to perform processing, and have UPS units 382 attached thereto.

An implementation plan utilizing the aforedescribed configuration proceeds from commissioning the project to benchmarking, i.e., establishing a baseline protocol of operations, and then analysis, optimization, monitoring and controlling. Cost savings using the principles of the present invention are achieved at each of the generic stages discussed below.

The first stage involves installation and set up of equipment. During installation, the property or facility in question is audited, assessed and profiled. Also, any meters, sub-meter devices, interactive control, or interface devices are installed, e.g., the aforementioned meters 314, as well as telecommunications interfaces, e.g., the various portals 306 illustrated and described in connection with FIG. 3. It should be understood that the preferred embodiment of the present invention utilizes bidirectional communications, whereas conventional "meters" as such are typically unidirectional. As discussed, an initial measurement of usage and operational data is acquired to determine a baseline or benchmark. Armed with this initial data, attempts are made in the second stage to reduce energy volume usage and costs by (1) analyzing real-time usage data, (2) profiling usage, investigating operating anomalies, and identifying quick wins, (3) benchmarking current expenditures and operation, and (4) optimizing the operating environment.

As energy usage patterns (and anomalies) are ascertained, the third stage is entered where the services provider negotiates contracts, e.g., energy purchase contracts and real-time tariffs, to secure a reduced price per unit volume of energy purchased. After a pattern or portfolio of energy usage is determined, aspects of the portfolio may be aggregated and leveraged to obtain discounts, e.g., a group of commonly-owned buildings may negotiate in greater bulk using the energy usage patterns. In any such negotiation, of course, the services provider must profile and predictively analyze the purchase contract's terms and conditions to select the best pricing arrangements.

With these negotiated contracts in place and energy prices reduced, the fourth stage is to further analyze energy volumes and associated costs to yet further reduce overall expenditures, for example, by interacting and intervening control with existing property energy management systems (EMS) for refined usage analysis and to optimize energy use predictively and in real time. Finally, upon the completion of this multi-stage optimization scheme, focus is made on reducing maintenance and resource costs, e.g., through remotely operating and controlling facilities and energy management systems, dispatching of energy strategies (distributed generation, thermal storage, loadshedding) and predictively monitoring maintenance scheduling and dispatching.

It should be understood that to implement the above methodology, an Energy Services Center, e.g., the ESC 235/300 described in connection with FIGS. 2 and 3, is needed to coordinate the complicated interplay of information exchange for optimization, as well as setting up a detailed process to bring a client's facility or facilities online. Since a given client may sign up multiple facilities geographically dispersed across a country or countries, implementation logistics issues are raised.

At the ESC 300, technicians working with the facility owners can analyze the facility and set up initial performance profiles. Operators can remotely monitor the site, note energy consumption, investigate and remove anomalies observed and balance economic concerns within pre-agreed service tolerance levels. A learning system could allow real-time optimization of energy consumption, direct virtual control and remote intervention of client equipment and systems, and provide detailed reporting and analysis of energy demand, giving end users a higher level of understanding of their energy consumption behavior and permit the ESC 300 to more accurately define demand projections (and consequently reduce the price) of energy commodity purchases.

The ESC 300 role in the energy value chain is administrative, i.e., providing front and back services, billing analysis and verification and help desk services; performance contracting, i.e., providing Heating, Ventilation and Air Conditioning (HVAC) analysis, mechanical design/ analyses of motors, chillers, compressors, turbines, etc., real-time systems control strategy and logic analysis, and managing installation and contractors; facilities management, i.e., real-time data acquisition and control, building survey and commissioning, maintenance integration and Supervisory Control and Data Acquisition (SCADA) Management; energy purchase, i.e., load modeling, portfolio analysis, and contract negotiations; and electric and gas utility services, i.e., rates and tariff analysis, tariff negotiations, settlements and service coordination.

Based upon Applicants' experience in this industry, as supported by survey results, clients considering "choice" want, in order of priority:

1. Savings against their total energy costs.
2. Enhanced service response.
3. Personal or custom product and service offerings to meet their needs.

Thus, the ability to both cost-effectively meet service expectations and develop products and services in these marketplaces relies heavily upon the innovative application of information and technology.

Applicants' invention has been shaped to address the emerging market opportunities from the client's perspective first, then for value-added business synergy with each business element, in the energy value chain, establishing Applicants' service as complementary rather than competitive.

Clients having multiple geographically dispersed facilities, e.g., commercial and industrial clientele, face heightened complexity in optimization of energy services. Initially preferred clients using the improvements set forth in the instant specification include facilities with an average annual supply-side energy expenditure of U.S. $100,000 or more or having a size of 50,000 square feet or more per facility. It should, of course, be understood, however, that the defined processes apply across all industries and markets, including residential. Since each industry's energy needs are unique, client selection is influenced by this fact with an initial focus on healthcare, hospitality, commercial real estate holders, education and corporate campuses, and retail shopping complexes.

Applicants have found that, on the supply side, up to 50% of the savings can be realized due to Applicants' realtime information processing and optimization capabilities. A database of energy efficiency and operational information about a site adds significant value in the supply-side negotiating process by providing detailed customer load-trends and characteristics to potential energy suppliers, combined with a verification mechanism to match actual energy billing to agreed-upon rates. In deregulated markets, for example, Applicant accomplishes savings by negotiating competitive energy supply agreements through power marketers. In regulated industries, savings are achieved by use of alternate tariffs (time-of-day, real-time pricing, economic development) or custom tariffs (competitive service agreements).

On the demand-side, Applicants have found that at least 75% of the savings are attributed to real-time monitoring, control and analytical capabilities with the remainder arising from associated survey and commissioning ("quick wins"). In particular, Applicants' real-time monitoring and control capabilities sustain and improve demand-side energy efficiency by modeling optimum building system performance and determination of favorable and unfavorable trends in energy consumption. Real-time monitoring also allows the prediction of future performance.

A complete supply-side approach would not only consider future energy procurement strategies, but would also thoroughly analyze historical billing records. This process reviews the correct use of applicable tariffs, the qualification for tax reduction or exemption programs, the accuracy of utility billing components, and the analysis and processing of potential energy-related credits or incentives.

Early focus of the application of the present invention is preferably directed to impending geographic areas of change (deregulation) to capture opportunities for rate (tariff) or pricing reductions available by participating in energy pilots or other available competitive programs. A matrix combining current facility unit pricing, state of deregulation activities, and geographic proximity will yield high priority facilities to initially address. Continual examination of completed and planned legislative changes is an integral part of Applicants' ongoing analysis activities.

As discussed, clients with property portfolios crossing multiple geographic boundaries will be exposed to significant variations and complexities involving available rates/tariffs, stages of deregulation, and the approach and style of serving utility governance, such as federal, state, cooperative, or municipal. Applicants serve to systematize these complex issues by combining and leveraging locations within utility and power marketer service regions, and aggregate facility load data and analyze load profiles, allowing continuous measurement against stated contract terms. Through this heightened analysis, leveraged negotiations to secure best (greatest overall value) prices for energy requirements can be obtained both from service to utilities in regulated markets and from power marketers in deregulated markets.

Applicants' invention offers a special attraction to power marketers through its real-time predictive optimization capabilities which, when made available to the marketer, result in refinement of their trading and arbitrage positions, a fact which is evidenced in the premium purchasing contracts offered to clients.

Subsequent to these services, Applicant intends to also offer other related, value-added services to their clients. These additional services include, but are not limited to, electronic summarized billing, Web-based reporting, capital investment strategies related to the pursuit of certain tariffs (such as purchase of transformation infrastructure, and peak shaving technologies), training, and strategic consulting regarding a variety of facility-related areas.

Figure 4:
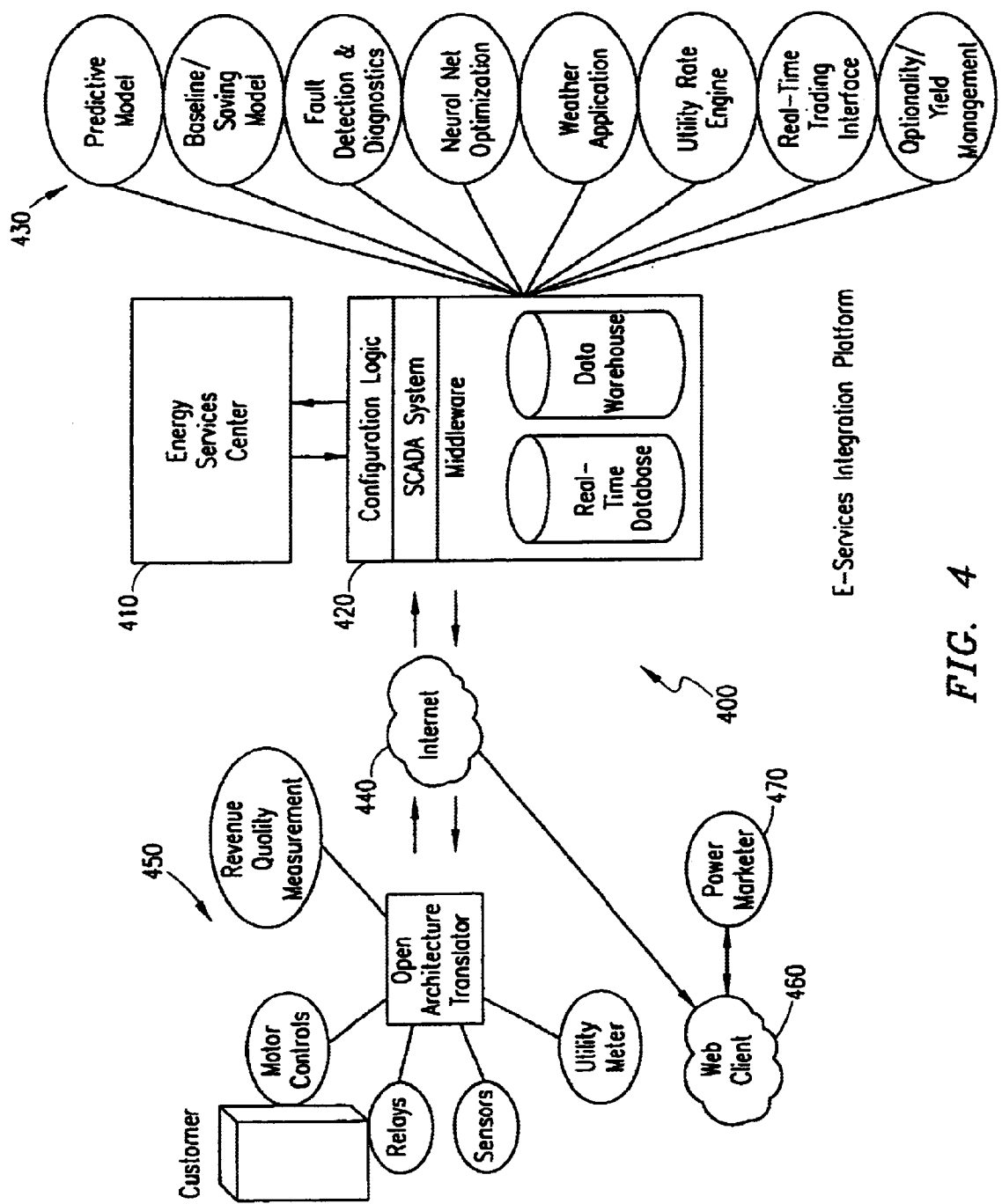
FIG. 4 illustrates another configuration illustrating the teachings of the present invention.

With reference now to FIG. 4, there is shown another embodiment of an energy management system pursuant to the teachings of the present invention. As shown, FIG. 4 provides a conceptual overview of an energy management service operating in accordance with the present invention. The E-Services integration platform, designated generally by the reference numeral 400, includes an ESC 410, Configuration Logic 420, and various models of operation generally designated by the reference numeral 430 connected, via an Internet 440, to a customer 450, and, via a web client connection 600, to a power marketer 470.

Figure 5:
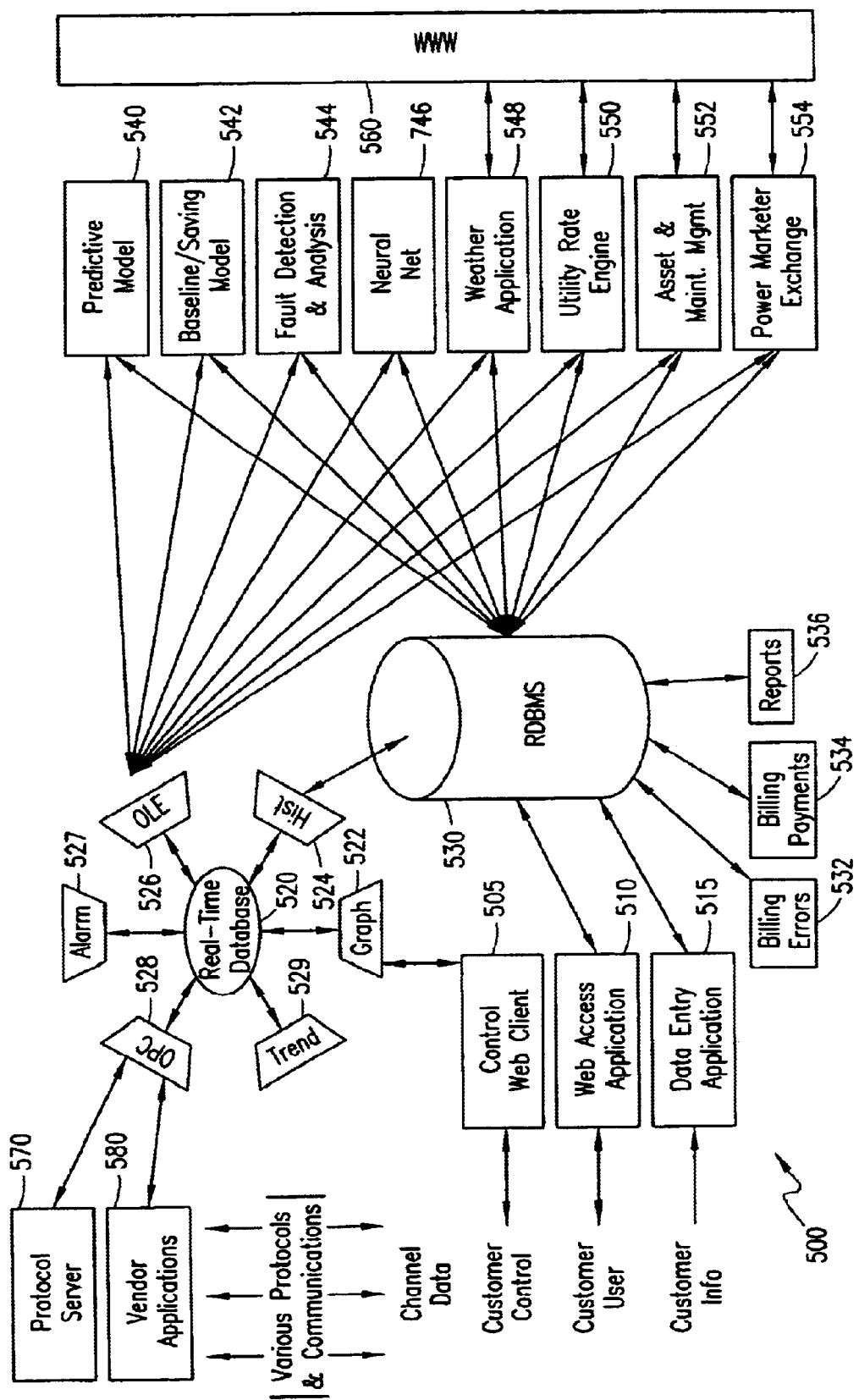
FIG. 5 illustrates yet another embodiment of the present invention.

With reference to FIG. 5, there is illustrated a further elaboration on a preferred embodiment for practicing the priniples of the present invention, generally designated by the reference numeral 500. A customer controls a service through accessing a Control Web Client node 505, uses the service via a Web Access Application node 510 and gets information through a Data Entry Application node 515. Through node 505, the customer accesses a real-time database 520, e.g., through a graph node 522. Database 520 is also connected to a history node 524, an Object Linking and Embedding node 526, an alarm node 527, an OPC node 528 and a trend node 529. The customer, via node 510, accesses a relational database management system (RDBMS) 530, which is connected to a billing error node 532, a bill payment node 534 and a report node 536. Both the RDBMS 530 and the OLE node 526 are connected to additional nodes 540 to 554, of which nodes 548 to 554 may be connected to an Internet 560. A protocol server 570 and a vendor application node 580 are conencted to node 528, and channel data pursuant to various protocols and communications standards.

As discussed above, the supply-side model is an ongoing and continually refined process, and is best described as a phased approach to reduced overall energy consumption and energy-related expenditure. Individual phases may occur simultaneously and be expected as pricing contract terms expire.

Phase one is devoted to data collection and analysis where historical billing and/or energy use data is compiled and analyzed. In the process, a compilation of billing or rate discrepancies are summarized. Any energy credits or incentives are determined and existing supply agreements analyzed, along with any outstanding third-party supply proposals. Any impending legislation affecting properties is reviewed, as well as existing property tariff arrangements.

Phase two, in a deregulated mileau, involves energy procurement negotiations. First, a prioritized list of properties is established and selected power marketers pre-qualified. Qualifications for energy pilots are reviewed and an estimated, aggregate load portfolio developed. Requests for Proposals to the power marketers are released, and energy supply proposals reviewed.

Phase two, in a regulated arena, involves rate and tariff negotiations. After establishing the prioritized list of properties, any applicable tariff options and certification status are determined. After developing negotiating strategies and objectives, a new agreement can be negotiated.

Phase three involves load profiling and contract performance analysis where data is gathered, analyzed as a load profile, and aggregated in a load portfolio.

Phase four involves the renegotiation of existing or negotiation of new contracts using the data acquired in the prior phases.

Applicants' unique value-added service provides clients with a range of choices for selecting solutions to meet their energy needs. Applicants' services can, for example, be exercised in a stand-alone fashion. However, the services are intended for integration to gain even greater savings with energy service providers, such as energy management vendors and power marketers, in meeting a client's total energy needs (including budgeting, purchasing, operating, and managing contractors, utility relationships, and payment of energy bills).

Savings of energy costs can be achieved in five different ways:

Reduce the amount of energy consumed, cutting transport and energy costs.

Reduce the price paid per unit of energy.

Optimize the costs of maintaining and replacing energy-related equipment, such as HVAC, chillers, and furnaces.

Reduce the costs of human resources involved in managing and providing facilities with energy services.

Reduce the cost of administration, including such as bill analysis, payments, and settlements, through efficiency gains.

Applicants create the means for delivering significant synergies across the energy value chain. These synergies include reducing the amount of energy used, obtaining the lowest rates, optimizing equipment and operations, and reducing people costs. When combined, these capabilities deliver a unique and compelling savings approach. Significant near-term savings are realized almost immediately, and initial installation or start-up investment costs are paid back well before the end of the first service year.

Applicants' invention provides around-the-clock, real-time decision analysis for optimizing energy costs in client facilities by balancing energy use and comfort or service levels through a dynamic integration of these operational demands with market pricing signals. Savings can be achieved regardless of whether the client's facility is located in a deregulated pro-choice region or a fully regulated utility service area. Applicants' invention in its simplest mode, unbundled and acting independently, can deliver annual savings on energy use ranging from 5 to 20 percent of total costs.

Applicants' capabilities afford clients the value-added benefits of three levels of service sophistication, which distinguish Applicants' services.

The first wave encompasses real-time remote meter reading and data acquisition with Web-based reporting and client interaction. Operating anomalies are noted, analyzed, and resolved. Initial optimization efforts are undertaken and aggregation of energy use is completed to be used later in energy procurement negotiations.

The second wave offers the ability for uniquitous interactive communications with multi-vendor building (energy) management systems. Procurement portfolios are refined and contracts negotiated. A further advanced level of optimization is implemented, and it balances the economics of these contracts with the service and operating needs.

The third wave offers real-time bi-directional diagnostic monitoring and optimal control with site energy management systems. At this stage, active intervention to create maximum synergies between operations and pricing signals occurs. Steps to affect remote virtual management of maintenance and facility support activities are undertaken. Targeted investments are made to improve performance and reduce cost.

A technological differentiation offered by Applicants' invention is in integrating SCADA (Supervisory Control And Data Acquisition) technology, facility automation technology, facility modeling, and HVAC technology with communications and energy management processes and controls to provide a seamless system for optimizing the procurement and use of energy to provide clients with lighting, heating, cooling, and environmental comfort from the energy they use.

In a preferred embedment, the ESC 300 provides five support facilities:

1) an operational data acquisition and control facility;
2) a service center for technical support;
3) a back-office facility for finance and administration;
4) a development center for the continued progression of Applicants' solutions and support of those existing technology solutions; and
5) a "center of excellence" for the demonstration of Applicants' capabilities.

The ESC preferably provides nationally available assistance, e.g., a toll-free number, and support specialists on staff to monitor, record and resolve client issues.

Through contacts with building personnel, data concerning the building is compiled consistent with the level of service. Typically, for low-level service, the data compiled consists of the building address, contact person, inventory of HVAC equipment, meter and incoming power specifications, existing energy management system, building operating procedures, and historical utility bills. For the highest level of service, additional data regarding the HVAC equipment and the building envelope is included. Floor plans with the HVAC zones and photographic views of the building are also obtained for display in graphics.

In order to gather data and allow interactive control, devices must be installed at each site for the collection of energy efficiency and operational data and communications interfaces to the ESC 300. Applicants' preferred techniques for the installation involves three waves:

Wave 1 uses an interface device to monitor the meters—electric, gas, steam, and chilled water and, in some applications, to monitor the power input to major mechanical equipment. A qualified electrical contractor must install devices such as current transformers or flow measuring sensors. The contractor will then activate communication with the ESC 300. The entire system is commissioned as described hereinbelow.

Wave 2 requires an interface to the building's existing energy management system. A skilled controls contractor must establish the communication interface to the ESC 300, which includes configuring a communication driver appropriate for the protocol used by the EMS. Proprietary systems require custom drivers, complicating this task. However, several drivers have already been developed to interface with major systems.

Wave 3 involves optimal control of the building systems and, therefore, bi-directional communication with the EMC. The existing EMC is either augmented or replaced, depending on the feasibility and cost-effectiveness. Typical variables measured and controlled include zone temperatures and set-points for major components of the HVAC system. A controls contractor installs the sensors, control devices, and the communication device.

As is understood in the art, Commissioning is the process for achieving, verifying, and documenting the performance of installed equipment to meet the operational needs within the capabilities of the design. The process is based on the industry standards (that is, the *Building Commissioning Guide,* version 2.2 July 1998, sponsored by U.S. General Services Administration and U.S. Department of Energy, Washington, D.C.). The commissioning is performed for each installation in two domains: at the site and at the ESC 300. The site installation contractor conducts tests of each data point and documents each input and output. Once the field commissioning is completed, the contractor notifies the ESC 300 to log on and conduct a similar remote validation.

When a client has multiple facilities, a phased "commissioning" approach is employed, in keeping with Applicants' goal to provide accelerated, measurable, and tangible benefits for its clients. The approach uses a number of selection criteria to determine the most appropriate schedule for commissioning each facility. While Applicants' services do not depend on the existence of a deregulated electricity market, the state of deregulation will affect the commissioning schedule.

Three criteria determine the commissioning schedule:

Current state of deregulation, with preference given to deregulated States. As discussed, each U.S. State falls into one of five categories regarding energy deregulation, ranging from newly restructured States to States with no deregulation activity.

Geographic density, with preference given to locations with the highest density.

Factors affecting implementation logistics, such as climate and time zone. Inclement weather often delays travel, and time zone issues can make communication difficult. Substantial communication between the ESC and the onsite team will be necessary during the initial commissioning period, making this factor significant. By reducing the impact of time zone changes, the teams are able to provide maximum overlap and support to each other during the first key stages of the implementation.

Measurement and verification of savings is an important issue for all parties. A "payment based upon performance" arrangement requires that all parties believe the information on which the payments are based is valid and accurate. The primary purpose of measurement and verification is to provide valid and accurate quantification of savings from the utilization of Applicants' invention. Applicants' approach to measurement and verification follows generally accepted industry protocol. Key mathematical and technical enhancements, used as appropriate, make the methodology more robust. Measurement and verification protocols have been developed by United States and international industry organizations, including the IPMVP (International Performance Measurement and Verification Protocol, U.S. Department of Energy, December 1997, available at http://www.eren.doe.gov, or http://www.ipmvp.org). Also, the American Society of Heating, Refrigeration, and Air-conditioning Engineers (ASHRAE) GPC 14P Committee is currently writing guidelines for the Measurement of Energy and Demand Savings. The ASHRAE document focuses on the relationship of the measurement to the equipment being verified at a technical level, while the IPMVP discusses a variety of measurement and verification topics as they relate to actual contracts for energy services. This section summarizes measurement and verification activities relating to Applicants' invention. The IPMVP and ASHRAE documents contain complementary and supplementary information.

Measurement and verification processes rely heavily on energy use modeling, which is necessary for forecasting, diagnostics, and optimal control.

At a fundamental level, energy use per day obtained from utility bills and the number of days in the billing period provides a simple, although rough, baseline. To normalize for weather, this quantity can be plotted as a function of average ambient temperature during the billing period, and a line can be generated by a number of methods, for example, by using a neural net. This neural net provides a baseline model with the average daily high outdoor temperature as the only input. Clearly, other factors, such as occupancy, influence energy consumption. If such data are available, a better baseline model can be established. It is desirable to have two years' data to properly account for occupancy effects. Energy usage may be illustrated as a function of the average high ambient temperature (the quantity that was provided in the utility bills).

After establishing communication links with the existing energy management systems, hourly (or more refined) data are available on a number of channels (in particular kWh), and possibly other building-specific factors. Weather variables such as ambient temperature and relative humidity are obtained either through site measurements or from a weather service. A neural net, continuously trained and refined with new data, is used to predict hourly energy use with predicted weather as input. Significant deviations from forecast energy use is used to generate diagnostic alarms.

One important aspect of Applicants' service is its ability to modify the operation of HVAC systems to achieve improved energy efficiency and comfort, as well as to provide a certain level of diagnostics of building operation. This requires more refined modeling of the entire building or selected subsystems. A simulation model based on building physics provides the necessary refinements. An as-built, as-operated hourly simulation model of the building is created by starting with the audit-derived model and then calibrating it with actual operational data. Proprietary software is used in this process.

Applicants' invention uses energy use models for measurement and verification, as well as for forecasting, diagnostics, and optimal control. A number of variables such as start-stop of systems, zone temperature set-points, chilled water set-points, and fan speeds, can be controlled in a building through an energy management system. An audit of the buildings is performed to determine the variables that can be usefully controlled. Inspection of monitored data, as well as neural net models and calibrated simulation models, are used to determine optimal operating conditions subject to user-specified comfort criteria. The necessary computations are performed at the Energy Services Center 300, and new parameters are passed to the energy management systems site.

Applicants' invention optimizes not only over local loops, but also globally over all the building systems-possibly in multiple buildings-over a user-specified time horizon. Consider, for example, the cooling system. The chiller energy consumption is minimized by setting the chilled water temperature as high as possible. However, as the chilled water temperature is set higher, the fans (in variable volume systems) have to move more air and thereby consume more energy (fans not only use energy to move more air, but eventually discharges the fan energy as heat into the cold air stream). Optimal control of chiller-plus-fans can result in different operating parameters. Further combining time-of-day prices and other factors results in even more intricate optimization issues.

Figure 6:
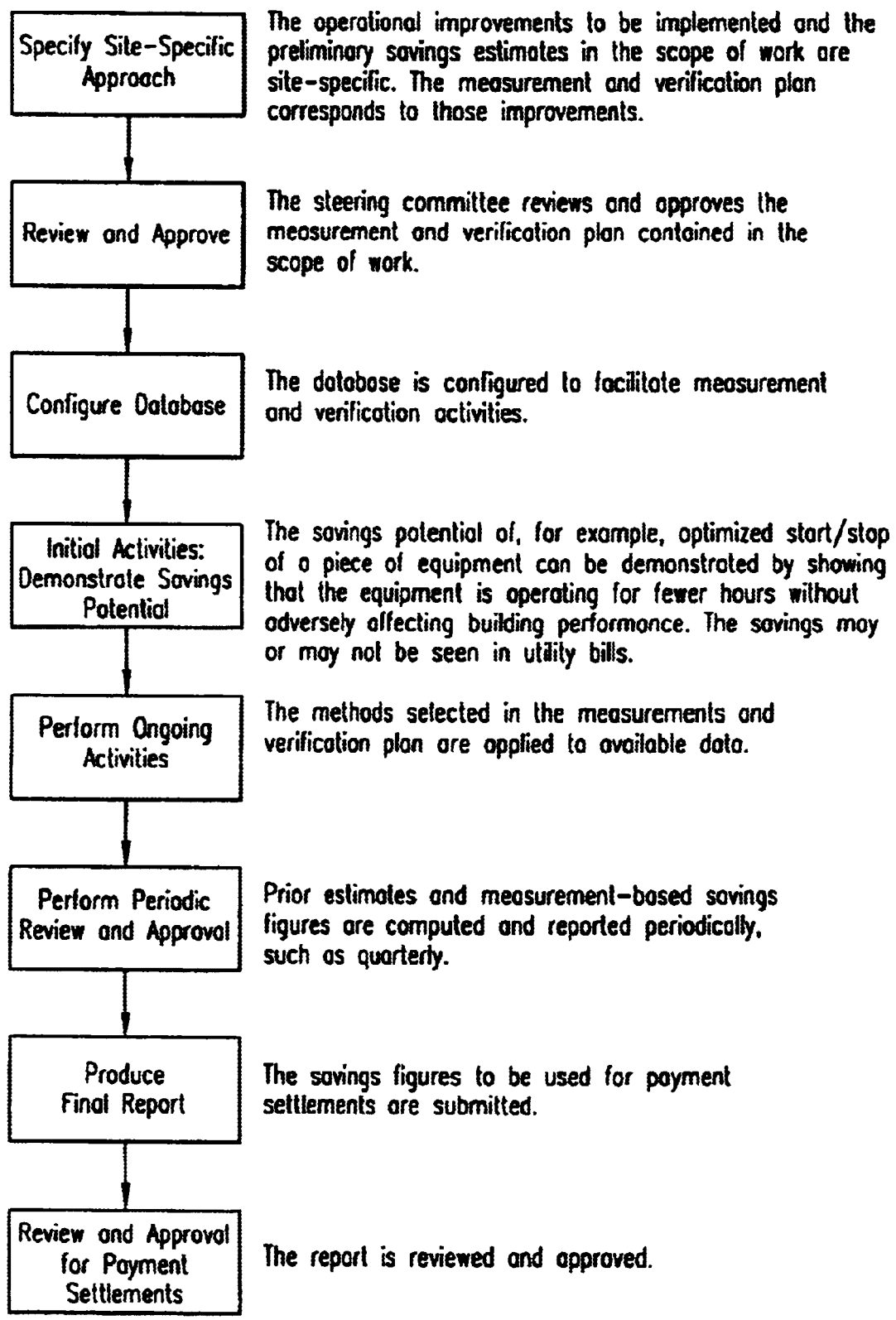
FIG. 6 generally illustrates a flow chart of a measurement and verification procedure pursuant to the teachings of the instant invention.

Measuring and verifying the cost savings in implementing the principles of the present invention depend upon whether the baseline conditions were accurately defined and whether the appropriate systems were properly installed and perform according to specifications. With reference now to FIG. 6, there is illustrated a flowchart describing the measurement and verification procedure.

With reference now to FIG. 7, there are illustrated several options for measuring and verifying cost savings. Of the four options described above, Option A is considered to be generally inapplicable for controls-related improvements.

Option B is employed when the appropriate data are available. For example, if electricity input, heat removal rate, entering condenser temperature, and leaving chilled water temperature are measured, a baseline model for a chiller can be developed by calibrating an audit model derived from the manufacturer's data. This model can then be used in estimating the savings as well as in designing an optimal controller. A simpler example is chilled water energy use when a building is cooled by chilled water supplied by a central plant serving multiple buildings. The cooling water energy can be related to ambient temperature and humidity, hour of the day, type of day (weekday, weekend, or holiday), and solar radiation. The resulting baseline model is then used in savings estimation. In fact, Haberl and Thamilseran presented a similar problem in a competition ("Predicting Hourly Building Energy Use: The Great Energy Predictor Shootout II: Measuring Retrofit Savings-Overview and Discussion of Results." *ASHRAE Transactions,* Vol. 102, Pt. 2, June 1996). Similar and enhanced neural nets are employed in developing a baseline model.

Option C is employed when hourly whole-building use data are available. The present invention preferably employs neural net and other models for energy use modeling and forecasting. When only utility bills are available, but not hourly data (this situation may arise if pre-installation data only consist of utility bills), monthly baseline models can still be generated; an alternative approach is to generate an hourly pre-installation model by calibrating the post-installation model to fit pre-installation utility data.

Option D is employed when hourly data are available for calibrating a detailed hourly simulation. Typically, the simulations require hundreds of inputs, and it is not feasible to estimate all of them using available data. A systematic approach to define and estimate a small number of parameters (that are complex non-linear functions of the raw parameters) was developed at the National Renewable Research Laboratory ("Short-Term Energy Monitoring in a Large Commercial Building," J. Burch, K. Subbarao, A. Lekow, M. Warren, and L. Norford, *ASHRAE Transactions*, Vol. 96, Pt. 1, pp. 1459–1477 (1990)). Applicants have made proprietary enhancements to this methodology since. The calibrated simulation is the most comprehensive. While neural net approaches are suitable for interpolation, simulations are suitable for "what-if" extrapolation and are therefore useful to account for changes in occupancy or building operation. In fact, they are used to develop optimal controllers, for example, to compute optimal temperature set-points under time-of-day or real-time prices.

Additional tests, such as "blink" tests (selectively turning certain systems off and on while monitoring building energy consumption), may be employed to provide additional data. In some cases indirect methods may be used. For example, if direct digital control retrofit results in a smaller deadband compared to pneumatic controls, it is possible to maintain slightly higher average temperatures in the cooling season without violating contractual obligations. Savings may be indirectly demonstrated from average temperatures before and after installation. It is common to have only monthly utility bills available for the pre-installation period; however, the present invention makes hourly data available for the post-installation period. Thus, suitable extensions are necessary, as demonstrated in the Detailed example using Option C included in the next section of this document, where we apply a neural net using daily energy use data.

Determining savings acceptable to all parties involves a process such as described in the IPMVP document. A typical process involves all parties agreeing at the outset upon a method to measure and verify savings. This method includes setting the benchmarks, as discussed above; collecting and validating historical information such as occupancy rates, temperature, conferences, and banquets; and cataloging projected or expected changes. An important element of this agreement is the expected uncertainty in the savings estimate. Issues to be addressed include a trade-off between increased measurement and verification costs and reduced uncertainty in the savings estimate. Typically, Option D costs more than Option B, which in turn costs more than Option C. However, models, developed as part of Applicants' optimal controller or forecasting services, are directly useful in savings estimates and will lower measurement and verification costs. At additional cost, an expert neutral arbitrator can review the method. Sometimes, an unbiased third party trained to measure and verify projects may be helpful to ensure agreement of measurement validity. Should conflicts arise, this third-party professional can become an invaluable tool as an- unbiased source of information. Measurement and verification professionals are often registered professional engineers working independently or for larger architectural and engineering and consulting firms. Many are members of industry professional societies such as The Association of Energy Services Professionals (AESP), the National Association of Energy Service Companies (NAESCO), or the American Society of Heating, Refrigerating, and Air-conditioning Engineers (ASHRAE).

By way of example in discussing the advantages of the present invention, consideration is now made to a hotel which has been operational for at least eight months, a period that typically covers a broad range of operating conditions. Additionally, let us consider the following assumptions:

A day is defined as the period from 8 a.m. to 8 a.m. the following morning, with daily averages and sums computed on this basis.

Daily total energy usage is computed based on the following:
Hourly energy usage, in kWh, e.g., as measured by devices in accordance with the present invention.
Hourly ambient temperature TAmbient, e.g., measured by the present invention or obtained from a weather service.

Daily occupancy, conference attendance, and banquet attendance are available, permitting us to calculate a composite daily index, which we will call OccupancyIndex.

Although not essential in all cases, the daily average relative humidity RH and cloud cover SUN are available from either measurement or a weather service.

For energy purposes, a day can be characterized by three day types: weekday (DayType=1), Friday/Saturday (Day/Type=2), and Sunday/Holiday (Day/Type=3).

For a given day number n, varying from 1 to 240 for the eight-month period of operation (generalization to longer periods is straightforward), there is the following equation:

$$KWH_{DayType}(n)=\text{Function}_{DayType}(T_{Ambient}(n), \text{OccupancyIndex}(n), RH(n), SUN(n))$$

Note that the variable Day Type is nominal. That is, its possible numerical value 1, 2, or 3 does not have any particular significance. It is therefore best to introduce separate functions for each day type, rather than make day type another variable similar to, for example, temperature.

The precise functional form is quite complex, and we will use a neural net to implicitly deal with this function. Of the 240 data sets, roughly 120 data sets are of Day Type=1, and 60 each are of Day Type=2 and 3. Consider, for example, Day Type=1. The 120 data sets can be divided into two groups each containing 60 randomly selected data sets. using one or more of the following neural net architectures (multilayer perceptron, radial basis functions, or generalized regression), a neural net will be trained on one group of 60 data sets, while the other group is used for validation, that is, to determine how well the net predicts kWh given the input variables. Several network architectures, number of nodes, and hidden layers will be evaluated and the best network selected.

The following additional assumptions can be made:
For the two years prior to operating in the hotel, the values of $T_{ambient}(n)$, RH(n), and SUN(n) can be obtained from meteorological records.
The hotel provides historical data for the two prior years from which OccupancyIndex(n) can be determined for each day.

The neural net previously developed can now be used to determine daily energy usage during the prior two years had the present invention been operational during that period.

Further assumptions include:
Utility bills are available for the prior two years and include kWh per day for each billing period.
No retrofits, additions, or equipment installations have been completed that would significantly affect energy use.

Accordingly, for the prior two years, there are modeled energy use $E_{with}$ with the benefits of the present invention and $E_{without}$ without the benefits of the present invention. From these results, a determination is needed for the post-installation billing periods, given the measured energy use $E_{with}$, what the energy use $E_{without}$ would have been for the post-installation period. One way to accomplish the task is to plot, for each billing period for the prior two years, kWh/day without for benefits of the present invention against kWh/day with the benefits of the present invention. A suitable curve through these points is used to determine $E_{without}$ given $E_{with}$. The quantity $[E_{without}-E_{with}]$ represents the savings.

It should be understood that it is always desirable to build engineering knowledge into a judicious choice of independent variables. For example, it is sometimes better to choose, instead of RH, the quantity $[T_{DewPoint}-T_{CoolingCoil}]_+$ as the independent variable, where $T_{dewPoint}$ represents the dew point of ambient air and $T_{coolingCoil}$ represents a typical cooling coil temperature (a default value of 55° F. may be used). The subscript + indicates that only positive values of the difference are to be used; if the value is negative, it is reset to zero.

It is also important to understand that some neural network architectures, while suitable for interpolation, are unsuitable for extrapolation outside the range over which the network was trained. Even those neural nets that are not explicitly unsuitable for extrapolation should not be extrapolated significantly outside the domain of independent variables in which they were trained. If significant extrapolation is involved, simulations should be considered to calculate changes in energy use to correct the values of $E_{without}$.

Additional points to consider when evaluating this scenario include the following:

This discussion should be extended to include electricity rates and demand issues to determine monetary savings.

If any retrofits or equipment changes were made that would affect energy use, hourly simulations should be considered to calculate changes in energy use and correct the values of $E_{without}$.

Indirect evidence should be used where appropriate. If, for example, the present invention optimizes start-stop of certain building systems, the reduced hours of operation of these systems may be used as evidence of energy savings.

The use of occupancy, conferences, and banquets as independent inputs versus a single composite index must be determined through an investigation.

Statistical errors of estimate obtained through the neural net training process should be used in determining uncertainties of savings estimates.

The models used in the savings determination are the same ones developed for the forecasting and optimization services of the present invention. This helps reduce the measurement and verification costs.

A number of variables such as start-stop of systems, zone temperature set-points, chilled water set-points, and fan speeds can be controlled in a building through an energy management system. While real-time optimal control generates savings, real-time pricing provides additional substantial savings opportunities. An audit of the buildings is performed to determine the variables that can be usefully controlled. Analysis of- monitored data using neural net models and calibrated simulation models determines optimal operating conditions subject to user-specified comfort criteria. The necessary computations are performed at the Energy Services Center and new parameters passed to the EMS site.

The present invention optimizes not only over local loops, but also globally over all the building systems and over a user-specified time horizon. Consider, for example, the cooling system. As discussed, the chiller energy consumption is minimized by setting the chilled water temperature as high as possible. However, as the chilled water temperature is set higher, the fans in variable volume systems have to move more air and thereby consume more energy (fans not only use energy to move more air, but the fan energy is eventually discharged as heat into the cold air stream). Optimal control of chiller-plus-fans can result in different operating parameters. Further, combining time-of-day prices and other factors results in even more intricate optimality issues.

The present invention represents a unique service designed not only to provide added value in the current regulated energy market, but also to meet the vastly different requirements that are evolving from the deregulation of energy markets. Applicant's solution, like the markets being created by this deregulation, is very different from current energy services. Even so, there are companies providing services similar to some of the less complex offerings provided by Applicants. These companies generally fall into five categories: power marketers, ESCOs, deregulated subsidiaries of investor-owned utilities, energy consultants, and facility management contractors. The current roles of the different players is discussed in more detail below.

Power Marketers

Independent power marketers sold 230 million MWh of electricity in 1996 (a 776 percent increase over 1995). As of July 1997, Federal Energy Regulatory Commission (FERC) had certified 288 power marketers, and today, this number is approaching 500 retail and wholesale providers.

These companies primarily address the energy commodity element of total energy costs (50 percent or less of a consumer's total expenditure). The opportunities to reduced the price per unit of energy that they provide apply only to deregulated environments. These companies have a "trader" mentality—their contracts are usually for one year or less, and in the face of uncertain margins, they are likely to retreat from a market. By their own value proposition, they are motivated to increase the volume of energy consumed by a client (albeit at a lower unit price).

Applicants work under agency arrangements with power marketers to negotiate energy commodity supply contracts on behalf of its clients, but it will not be dependent upon the power marketers to deliver the overall value proposition to a client.

A point of some interest is that power marketers working under these agency arrangements are also likely to be Applicants' "clients." The tracking of real-time data for monitoring the end client's energy demand behavior can provide power marketers an increased opportunity for refining trading positions and arbitrage. Providing access to this information is expected to afford power marketers the means for improving margins and mitigating their potential risk exposure.

ESCOs

ESCOs comprise a diverse number of suppliers that generally fall into one of three categories:

Equipment manufacturers

Non-regulated subsidiaries of utilities

Software developers

By the nature of their service offering, ESCOs support a single, but important, niche within the energy value chain. It is not yet clear whether those ESCOs that are subsidiaries of regulated utilities are able to offer clients solutions that are independent of their parent company's objectives. Most of these suppliers provide services on a traditional contract performance fee basis—they have, as yet, shown little willingness to take on risk.

Historically, sales cycles for these offerings are lengthy, with extended, multi-year payback periods. Differentiation in the marketplace is difficult. Applicant's knowledge and insight into operational matters is expected to offer rapid validation of planning facts and a means to match investments to quick returns.

Utilities

Many utilities in deregulating States are establishing non-regulated subsidiaries to provide retail and wholesale services. Successful utilities will need to transform themselves into client service-oriented organizations and leverage the potentially superior knowledge they have of their existing client base. For these utilities, the opportunity to utilize the present invention as a non-regulated business venture provides them an attractive way of extending their service offering to their commercial and industrial clients.

On the regulated side, the management of distribution network assets is evolving towards dynamic real-time practices and systems. Effectiveness will be heavily dependent on knowledge of individual client demand. Applicants' information streams can be readily integrated with distribution automation systems.

Consultants

Energy consulting firms are advisors to clients regarding their energy needs. Most consulting firms also prepare information for, or provide it to, clients regarding testimony and other legal issues pertaining to their energy needs.

Facility Management Contractors

Facility management contractors provide day-to-day management of a client's facilities. This service may include operation and maintenance, repair of equipment, janitorial services, grounds maintenance, and other tactical tasks. Facility management contractors rarely act on the client's behalf regarding the purchase of energy. Most often, a critical disconnect occurs between the operational staff and the energy procurement team, often resulting in little or no knowledge of the demand side effects on energy costs. The present invention provides the link to fill the operations-to procurement gap. Real-time analysis of energy consumption and monitoring, as well as optimization and control of facility equipment, results in a complimentary position taken by Applicants.

As discussed, the energy savings principles of the present invention are readily applicable to a variety of potential customers, particularly, commercial and industrial in nature.

Hotels typically spend in the region of 10 percent of their operating budgets on energy, or US$1 million per hotel or between U.S.$5,000 and U.S.$10,000 per room per year. A hotel company with 50,000 rooms is, therefore, likely to be spending in excess of U.S.$250 million annually on energy. The available hospitality market is over three million rooms, or a total energy expenditure between U.S.$15 billion and U.S.$30 billion annually.

Historically, the medical industry was reimbursed on overall operating costs, so energy expenditures were not scrutinized as critically as today. The extremely high cost per square foot results from the need for very high air exchanges that protect the interior environment from airborne contamination. The critical nature of the industry's energy use provides fertile opportunities to exploit the monitoring services of the instant invention. Additionally, a healthcare facility's load profile lends itself to better energy pricing when integrated with advanced energy technologies. The operational energy savings opportunities within a healthcare facility are similar to the hospitality industry's, but they are amplified through every component: larger equipment, more staff, higher number of air exchangers, tighter operating budgets, more conflicts with occupants' comfort requirements, and critical environmental requirements. The staff needs quick and accurate information to respond to equipment malfunctions to prevent emergency situations.

The methodology of the present invention can alert the staff via pager and have alarm information routed to the personnel in order to remedy the problem. The building's load profile may be analyzed for purchasing energy and introducing new energy technologies. For energy purchasing, the load profile analysis is necessary to achieve the most attractive energy pricing. By submetering, each area is isolated and then control strategies formulated to adjust energy peak time. The high operating energy costs, along with more stable ownership of healthcare facilities, allow for investment in energy technologies such as cogeneration, absorption chillers, micro turbines, heat recovery, and thermal storage, all of which benefit from the ESC's monitoring and controls capabilities. The methodology of the present invention can provide the data necessary to determine the most attractive approach and can create control algorithms to maximize the use of the applied technology. Energy use in commercial buildings accounts for an estimated U.S.$85 billion each year. According to estimates by the U.S. Department of Energy, about half of this amount could be saved through proper design, operation, and maintenance. From another perspective, the U.S. Department of Energy's Efficient Lighting Association suggests lighting costs represent approximately 25 to 40 percent return on investment for upgrading lighting.

Real estate executives have been reluctant to fully utilize state-of-the-art technologies for saving energy because most leases provide that utility expenses would be passed on to the tenants. The major features for their buildings were appearance, location and tenant comfort. generally, during construction, the controls budget suffered, making up for budget overruns earlier in the project. The mind-set has been to seek low-end cost without regard to operating expenses. The maintenance staff for most office facilities have minimal skills and rely on outside service contractors for most mechanical maintenance and operating improvement suggestions. This situation, along with a high staff turnover, further discourages building owners from investing in technologies for lowering operating costs. Most buildings operate at such a low level of efficiency that, even in the Sunbelt in the United States, a building will use almost as much energy in the winter as the summer. This occurs because the controls between the heating and cooling systems work against each other. Energy for heat is being spent to overcome energy spent for cooling. The result is that most buildings create their own comfort complaints.

Deregulation of the electric industry and the desire to increase cash flow from buildings have created an opportunity for the enlightened building owner to take advantage of these changes. The methodology of the present invention provides the ability to aggregate an entire portfolio of buildings as a single load in order to negotiate lower energy prices. Further, the present methodology leverages the cost of implementing the proper techniques within a building to maximize the optimal use of energy. The support provided to the onsite building staff, through the expert knowledge provided by Applicants to perform their tasks, increases their level of efficiency. Because an office building's load profile matches the peak of a utility, an aggressive predictive model is needed to create the control algorithms that prevent excessive energy usage during these high rate times.

Applicants have been involved in controls projects with several large industrial clients. These projects involved many types of equipment that were successfully interfaced to an energy management system, such as chillers, boilers, high and low pressure steam, heat exchangers, frequency drives, de-aerators, hydraulics, bulk chemical distribution, high resistivity water, reverse osmosis, multiple gases distribution, smoke abatement, scrubbed exhaust, and VOC (volatile organic compounds). Applicants' methodology is able to control a wide variety of industrial-type control applications in many different industrial environments, and experience in these fields accords a unique ability to bring significant energy savings to the industrial world.

One such project involved over 1.5 million square feet of manufacturing space for U.S. Department of Defense projects. The goal was to provide the facility operators with a graphical navigation of the 100 buildings' mechanical equipment throughout the complex. Energy use, temperature control, and trending were used to prevent system failures in a number of security-sensitive areas. Although no energy savings were tracked, the system improved the productivity of the maintenance personnel so that the staff was reduced by three engineers.

Another effort required control and monitoring of their air-conditioning and pneumatic supply systems. The goal was to improve the equipment's operation schedules, peak demand control, and chiller optimization. The result was an 18 percent reduction in energy consumption that translated into a nine-month return on investment for the energy management system.

One final illustration had similar goals, but the equipment controlled was quite different. This facility had many more buildings and pieces of equipment to network. The principal HVAC systems were rooftop-mounted packaged units, along with large air compressors for their pneumatics. One particular area of interest was their research and development building that operated 24 hours a day and required a tight temperature tolerance. The maintenance engineers were able to reduce both the peak demand and consumption and achieve an 11-month return on investment. Additionally, maintenance staff were able to identify problematic HVAC units prior to their failure by monitoring their discharge temperatures. This significant benefit produced great productivity savings for the maintenance staff, but also saved energy by not overloading the other units. Prior to using the EMS of the instant invention, they typically had multiple units down in the same area and problems manifested themselves only after the interior environment exceeded its comfort level.

The retail sector has a different approach to EMS in that the control algorithms are written to reduce programming time, thus reducing installation costs. Retail stores have several types of cooling systems that are configured to maximize comfort for the shoppers. Cooling and lighting are the two major areas for control. Parking lot lighting is incorporated into the system and is combined with the use of a photocell.

The majority of retail stores have no local maintenance personnel, and on-site staff has limited skills. For this reason, most maintenance operations are managed at a central location. The principles of the present invention are, therefore, highly desirable for these operations due to central scheduling, monitoring of daily energy usage, temperature trending, alarm reporting of equipment malfunctions, and preventive maintenance management. Most retail operations have such tight operating margins that they cannot afford to invest internally in a central control center.

Grocery stores and supermarkets represent -a large segment of the energy services market. The United States has approximately 71,000 grocery stores and supermarkets, with combined annual sales of over U.S.$380 billion. Energy expenditures are their second leading operating expense after labor costs. Grocery stores with no monitoring or EMS have potential problem areas regarding low-temperature and medium-temperature refrigeration and store air-conditioning. Food can easily spoil when a mechanical malfunction occurs and goes undiscovered for a time. Most grocery stores do not have any on-site maintenance personnel who can respond quickly. The store air-conditioning systems can also cause heavier loads on refrigeration equipment if it fails or has not been turned on during times of high outside temperatures. These issues, along with a lack of demand control, can easily justify the implementation of the instant invention. Similar to the retail industry, the grocery operations rely on centralized management of their maintenance. The present invention allows grocery companies to leverage their information in order to aggregate their energy purchasing as they now do for all their other commodities.

A priority for this industry is monitoring the refrigeration to minimize produce spoilage. Alarm monitoring and reporting can be a very significant feature for a grocery chain. Both retail and grocery stores' operating margins are in the three percent range, meaning that U.S.$100 in energy savings equals U.S.$3,000 in store sales.

It should be understood that the principles of the present invention, although fully useful in the energy procurement context, are adaptable for a variety of related contexts as well, e.g., in operational improvement capabilities, whereby the interactive control of numerous components offers savings to building owners.

The previous description is of a preferred embodiment for implementing the invention, and the scope of the invention should not necessarily be limited by this description. The scope of the present invention is instead defined by the following claims.

What is claimed is:

1. A method of facilitating energy consumption optimization, the method comprising the steps of:

establishing a plurality of clients, each client being associated with at least one facility, on an energy control system;

receiving, at the energy control system, of gross consumption data and equipment-specific consumption data of the at least one facility;

determining, at the energy control system, a baseline for energy consumption from the gross consumption data, the equipment-specific consumption data, previous utility bills, and neural nets, wherein the baseline is formed from monitoring existing usage of energy;

performing, at the energy control system, predictive modeling using the baseline and the gross consumption data and the equipment-specific consumption data, wherein the predictive modeling is used to rationalize energy-related opportunities for the at least one facility and create control algorithms to prevent excessive energy usage during high rate times;

negotiating, at the energy control system, energy supply agreements and discounts with at least one energy provider of at least one energy resource based on the baseline and the predictive modeling;

performing an optimization analysis based on the baseline, the gross consumption data, and the equipment-specific consumption data;

identifying at least one of an anomaly and an opportunity for cost-savings;

optimizing, via remote control, of energy consumption of a plurality of building systems; and wherein at least one setting of at least one of the plurality of building systems is adjusted based on at least one of a result of the step of identifying and a result of the step of performing the optimization analysis.

2. The method of claim 1, wherein the energy resource comprises at least one of electricity, natural gas, coal, and steam.

3. The method of claim 1, wherein the step of optimizing turning off at least one of the plurality of building systems.

4. The method of claim 1, wherein the step of optimizing reducing energy consumption of at least one of the plurality of building systems.

5. The method of claim 1, wherein the plurality of building systems comprises at least one of lighting, heating, and cooling systems.

6. The method of claim 1, wherein the step of optimizing comprises providing recommendations relative to at least one of initiatives and actions for improvement.

7. The method of claim 1, wherein the step of optimizing is performed in real-time.

8. An article of manufacture for causing at least one processor to generate information for optimizing energy consumption, the article of manufacture comprising:
a computer readable medium;
a plurality of instructions stored on the computer readable medium, the plurality of instructions configured to cause the at least one processor to perform the steps of:
establishing a plurality of clients, each client being associated with at least one facility, on an energy control system;
receiving, at the energy control system, gross consumption data and equipment-specific consumption data of the at least one facility;
determining, at the energy control system, a baseline for energy consumption from the gross consumption data, the equipment-specific consumption data, previous utility bills, and neural nets, wherein the baseline is formed from monitoring existing usage of energy;
performing, at the energy control system, predictive modeling using the baseline and the gross consumption data and the equipment-specific consumption data, wherein the predictive modeling is used to rationalize energy-related opportunities for the at least one facility and create control algorithms to prevent excessive energy usage during high rate times
negotiating, at the energy control system, energy supply agreements and discounts with at least one energy provider of at least one energy resource based on the baseline and predictive modeling;
performing optimization analysis based on the baseline and the gross consumption data and equipment-specific consumption data;
identifying at least one of an anomaly and an opportunity of cost-savings; and
optimizing energy consumption through remotely controlling building systems, wherein at least one setting of at least one of the building systems is adjusted based on a result of at least one of the step of identifying and the step of performing optimization analysis.

9. The article of manufacture of claim 8, wherein the step of identifying is repeated a plurality of times.

10. The article of manufacture of claim 8, wherein the step of negotiating comprises releasing real-time information to power marketers.

11. The article of manufacture of claim 8, wherein the plurality of instructions comprises:
auditing energy-billing information; and
modeling new energy supply agreements based on the audited energy-billing information.

12. The method of claim 8, wherein the energy resource comprises at least one of electricity, natural gas, coal, and steam.

13. The method of claim 8, wherein the step of optimizing comprises reducing energy consumption of at least one of the plurality of building systems.

14. The method of claim 13, wherein the step of optimizing comprises turning off at least one of the plurality of building systems.

15. The method of claim 8, wherein the plurality of building systems comprises at least one of lighting, heating, and cooling systems.

16. A system for facilitating energy consumption optimization, the system comprising:
means for establishing a plurality of clients, each client being associated with at least one facility, on an energy control system;
means for receiving, at the energy control system, of gross consumption data and equipment-specific consumption data of the at least one facility;
means for determining, at the energy control system, a baseline for energy consumption from the gross consumption data, the equipment-specific consumption data, previous utility bills, and neural nets, wherein the baseline is formed from monitoring existing usage of energy;
means for performing, at the energy control system, predictive modeling using the baseline and the gross consumption data and the equipment-specific consumption data, wherein the predictive modeling is used to rationalize energy-related opportunities for the at least one facility and create control algorithms to prevent excessive energy usage during high rate times
means for negotiating, at the energy control system, energy supply agreements and discounts with at least one energy provider of at least one energy resource based on the baseline and the predictive modeling;
means for performing an optimization analysis based on the baseline, the gross consumption data, and the equipment-specific consumption data;
means for identifying at least one of an anomaly and an opportunity for cost-savings;
means for optimizing, via remote control, of energy consumption of a plurality of building systems; and
wherein at least one setting of at least one of the plurality of building systems is adjusted based on at least one of an output of the means for identifying and the means for performing the optimization analysis.

17. The method of claim 16, wherein the energy resource comprises at least one of electricity, natural gas, coal, and steam.

18. The method of claim 16, wherein the step of optimizing comprises reducing energy consumption of at least one of the plurality of building systems.

19. The method of claim 18, wherein the step of optimizing comprises turning off at least one of the plurality of building systems.

20. The method of claim 16, wherein the plurality of building systems comprises at least one of lighting, heating, and cooling systems.

* * * * *

UNITED STATES PATENT AND TRADEMARK OFFICE
CERTIFICATE OF CORRECTION

PATENT NO. : 6,785,592 B1
DATED : August 31, 2004
INVENTOR(S) : Edward M. Smith et al.

It is certified that error appears in the above-identified patent and that said Letters Patent is hereby corrected as shown below:

Column 2,
Line 58, replace "(hotel vs. hospital)" with -- (hotel vs. hospital). --

Column 3,
Line 2, replace "electricity to a gas as" with -- electricity to gas as --

Column 4,
Line 52, replace "individualized is product" with -- individualized product --

Column 6,
Line 14, replace "realtime" with -- real-time --

Column 10,
Line 27, replace "realtime" with -- real-time --

Column 13,
Line 67, replace "chilled water" with -- chilled water— --

Column 19,
Line 60, replace "Analysis of-" with -- Analysis of --

Signed and Sealed this

Twenty-sixth Day of October, 2004

JON W. DUDAS
*Director of the United States Patent and Trademark Office*